(12) United States Patent
Ahn et al.

(10) Patent No.: US 11,779,953 B2
(45) Date of Patent: Oct. 10, 2023

(54) SLOT DIE FOR MANUFACTURING RECHARGEABLE BATTERY ELECTRODE

(71) Applicants: SAMSUNG SDI CO., LTD., Yongin-si (KR); Korea University Research and Business Foundation, Seoul (KR)

(72) Inventors: Won-Gi Ahn, Yongin-si (KR); Yongho Kim, Yongin-si (KR); Jin Seok Park, Seoul (KR); Juhye Bae, Yongin-si (KR); Hyeri Eom, Yongin-si (KR); Min-young Jeong, Yongin-si (KR); Hyun Wook Jung, Seoul (KR)

(73) Assignees: SAMSUNG SDI CO., LTD., Yongin-si (KR); KOREA UNIVERSITY Research and Business Foundation, Seoul (KR)

( * ) Notice: Subject to any disclaimer, the term of this patent is extended or adjusted under 35 U.S.C. 154(b) by 226 days.

(21) Appl. No.: 16/952,354

(22) Filed: Nov. 19, 2020

(65) Prior Publication Data

US 2021/0151732 A1    May 20, 2021

(30) Foreign Application Priority Data

Nov. 20, 2019   (KR) .......................... 10-2019-0149286

(51) Int. Cl.
    *B05C 5/02*      (2006.01)
    *B29C 48/305*    (2019.01)
    (Continued)

(52) U.S. Cl.
    CPC .............. *B05C 5/0262* (2013.01); *B05D 1/36* (2013.01); *B29C 48/305* (2019.02);
    (Continued)

(58) Field of Classification Search
    CPC ... B05C 5/0262; B05C 5/0266; B05C 5/0254; H01M 4/0402; H01M 4/62;
    (Continued)

(56) References Cited

U.S. PATENT DOCUMENTS

2006/0099289 A1   5/2006   Fukumura
2013/0236651 A1   9/2013   Komatsubara et al.
2014/0331923 A1   11/2014  Kim et al.

FOREIGN PATENT DOCUMENTS

CN   102527576 A   7/2012
CN   104174547 A   12/2014
(Continued)

OTHER PUBLICATIONS

English translation (Description) of JP2018089599 published Jun. 14, 2018 (Year: 2018).*

(Continued)

*Primary Examiner* — Laura Edwards
(74) *Attorney, Agent, or Firm* — Lee IP Law, P.C.

(57) ABSTRACT

A slot die for manufacturing a rechargeable battery electrode includes a first block with a chamber to accommodate an active material slurry, a second block facing and attached to the first block, a shim between the first and second blocks and including facing end portions, and a slot between the first and second blocks, and between the facing end portions, the slot including a first side defined by the first block, and a second side defined by the second block and facing the first side. Each of the end portions of the shim includes a width adjuster protruding to a second reference point from a first reference point in a width direction by a first adjusting width, extending to a third reference point from the second reference point at a first angle with respect to a discharging direction, and having a first adjusting length in the discharging direction.

16 Claims, 14 Drawing Sheets

(51) Int. Cl.
*B05D 1/36* (2006.01)
*H01M 4/04* (2006.01)
*H01M 4/62* (2006.01)
*H01M 4/02* (2006.01)

(52) U.S. Cl.
CPC ....... *H01M 4/0402* (2013.01); *H01M 4/0404* (2013.01); *H01M 4/62* (2013.01); *H01M 2004/025* (2013.01)

(58) Field of Classification Search
CPC .......... H01M 2004/025; H01M 4/0404; B05D 1/36; Y02E 60/10; B29C 48/155; B29C 48/305; B29C 48/08; B29L 2031/3468
USPC ........................................................ 118/410
See application file for complete search history.

(56) References Cited

FOREIGN PATENT DOCUMENTS

| | | | |
|---|---|---|---|
| CN | 104487175 | A | 4/2015 |
| CN | 106000796 | A | 10/2016 |
| CN | 106216179 | A | 12/2016 |
| CN | 205797680 | U | 12/2016 |
| JP | 2013-176748 | A | 9/2013 |
| JP | 2018-089599 | A | 6/2018 |
| KR | 20150031036 | * | 3/2015 |
| KR | 10-2016-0074331 | A | 6/2016 |
| KR | 10-2017-0037174 | A | 4/2017 |
| KR | 10-1841346 | B1 | 3/2018 |

OTHER PUBLICATIONS

Chinese Office Action dated Jan. 10, 2022, and accompanying Search Report dated Dec. 22, 2021, for corresponding Chinese Patent Application No. 202011306734.4.

Extended European Search Report dated Apr. 15, 2021, for corresponding European Patent Application No. 20209037.9.

Chinese Office Action dated Aug. 1, 2022, and accompanying Search Report dated Jul. 25, 2022, for corresponding Chinese Patent Application No. 202011306734.4.

Chinese Notice of Allowance dated Jan. 20, 2023 for corresponding CN 202011306734.4

* cited by examiner

SLOT DIE FOR MANUFACTURING RECHARGEABLE BATTERY ELECTRODE

CROSS-REFERENCE TO RELATED APPLICATION

Korean Patent Application No. 10-2019-0149286, filed on Nov. 20, 2019, in the Korean Intellectual Property Office, and entitled: "Slot Die for Manufacturing Rechargeable Battery Electrode," is incorporated by reference herein in its entirety.

BACKGROUND

1. Field

The present disclosure relates to a slot die for manufacturing a rechargeable battery electrode. More particularly, the present disclosure relates to a slot die for manufacturing a rechargeable battery electrode including a shim member for controlling a discharging rate of an active material slurry coated on a substrate.

2. Description of the Related Art

A rechargeable battery repeats charging and discharging, differing from a primary cell. A small rechargeable battery is used for portable small electronic devices, e.g., a mobile phone, a laptop computer, or a camcorder. A large capacity and high density rechargeable battery is used to store motor driving power or energy of hybrid vehicles and electric vehicles.

The rechargeable battery may include an electrode assembly for charging and discharging a current, a case for receiving the electrode assembly and an electrolyte solution, a cap plate combined to an opening of the case, and an electrode end drawn out of the electrode assembly outside of the cap plate.

The electrode assembly may be formed by disposing electrodes on respective sides of a separation film that is an electrical insulator, and spirally winding the separation film and the electrodes, stacking them, or mixing them. The separation film allows charging and discharging of the electrode assembly by separating the electrodes with different polarities and maintaining ion conductivity in the electrode assembly. The electrodes are formed by coating an active material slurry on the substrate.

A slot die is used when the electrode is manufactured by coating the active material slurry on the substrate. The slot die may include a lower block and an upper block for forming a chamber for supplying the active material slurry and setting a height of a slot for discharging the active material slurry, and a shim member installed therebetween and setting a width of a slot.

SUMMARY

An exemplary embodiment of the present disclosure provides a slot die for manufacturing a rechargeable battery electrode, including a first block having a chamber to accommodate an active material slurry, a second block facing the first block, the first block and the second block being attached to each other, a shim member positioned between the first block and the second block, the shim member including end portions facing each other, and a slot between the first and second blocks, and between the facing end portions of the shim member, the slot to discharge the active material slurry, and the slot including a first side defined by the first block, the first side extending in a width direction and a discharging direction of the slot, and a second side defined by the second block, the second side facing the first side and extending in the width direction and the discharging direction of the slot, wherein each of the end portions includes a width adjuster protruding to a second reference point from a first reference point of the shim member in the width direction by a first adjusting width, extending to a third reference point from the second reference point at a first angle with respect to the discharging direction, and having a first adjusting length in the discharging direction.

A width ratio (Lw/W) of the first adjusting width (Lw) vs. a width (W) of the slot may be greater than 0 and equal to or less than 0.1 ($0<Lw/W \leq 0.1$). The width ratio (Lw/W) of the first adjusting width (Lw) vs. a width (W) of the slot may be equal to or greater than 0.02 and equal to or less than 0.06 ($0.02 \leq Lw/W \leq 0.06$).

A length ratio (Ls/S) of the first adjusting length (Ls) vs. a length (S) of the slot in a discharging direction may be greater than 0 and equal to or less than 0.5 ($0<Ls/S \leq 0.5$).

The first angle $\theta 1$ may be greater than 0° and equal to or less than 30° ($0°<\theta 1 \leq 30°$).

The width adjuster may include a width increased portion for gradually increasing a width of the slot from a minimum width of the slot in the discharging direction.

The width adjuster may further include a width reduced portion connected to the width increased portion in the discharging direction and gradually reducing the width of the slot in the discharging direction.

The width adjuster may be formed to be inclined with a second angle $\theta 2$ in an opposite direction to the first angle with respect to the discharging direction to a fourth reference point from the third reference point of the shim member.

The second angle $\theta 2$ is greater than 0° and equal to or less than 15° ($0°<\theta 2 \leq 15°$).

The width adjuster may further include a convex round portion further connected to the width reduced portion in the discharging direction, formed to be round at an end of the discharging direction, and increasing a width of the slot in the discharging direction.

The width adjuster may include an additional width increased portion further connected to the width increased portion in the discharging direction and gradually additionally increasing a width of the slot in the discharging direction.

The width adjuster may be formed to be inclined with a third angle $\theta 3$ in a direction of the first angle with respect to the discharging direction to a fifth reference point from the third reference point of the shim member.

The third angle $\theta 3$ is greater than 0° and equal to or less than 25° ($0°<\theta 3 \leq 25°$).

The width adjuster may further include a concave round portion further connected to the additional width increased portion in the discharging direction, formed to be round at the end of the discharging direction, and reducing the width of the slot in the discharging direction.

The width adjuster may be formed in a straight line in the height direction so as to be vertically connected to the first side and the second side.

The width adjuster may be formed to be concave round or convex round toward the slot so as to be connected to the first side and the second side in a round way.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
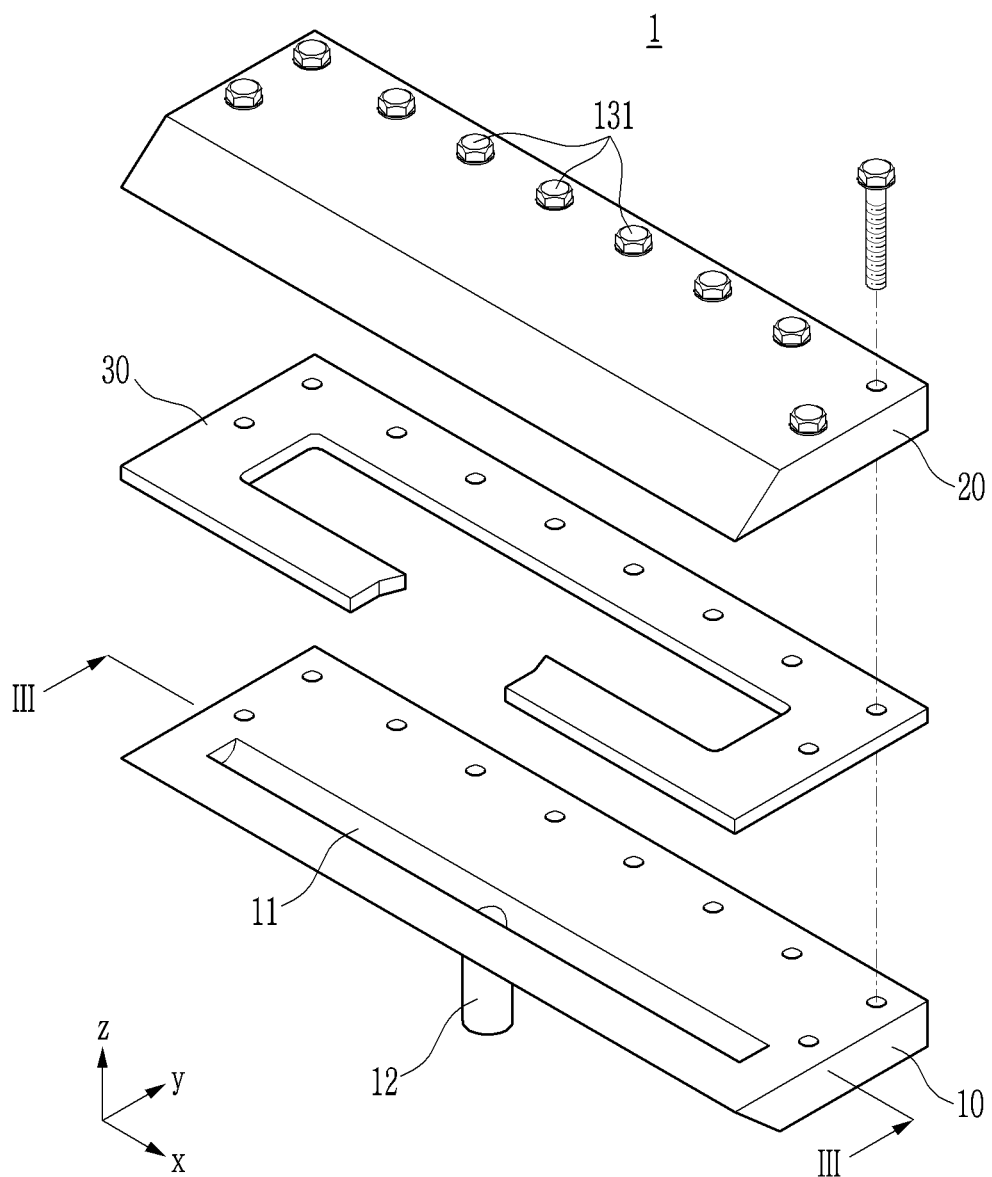
FIG. 1 shows an exploded perspective view of a slot die for manufacturing a rechargeable battery electrode according to a first exemplary embodiment

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
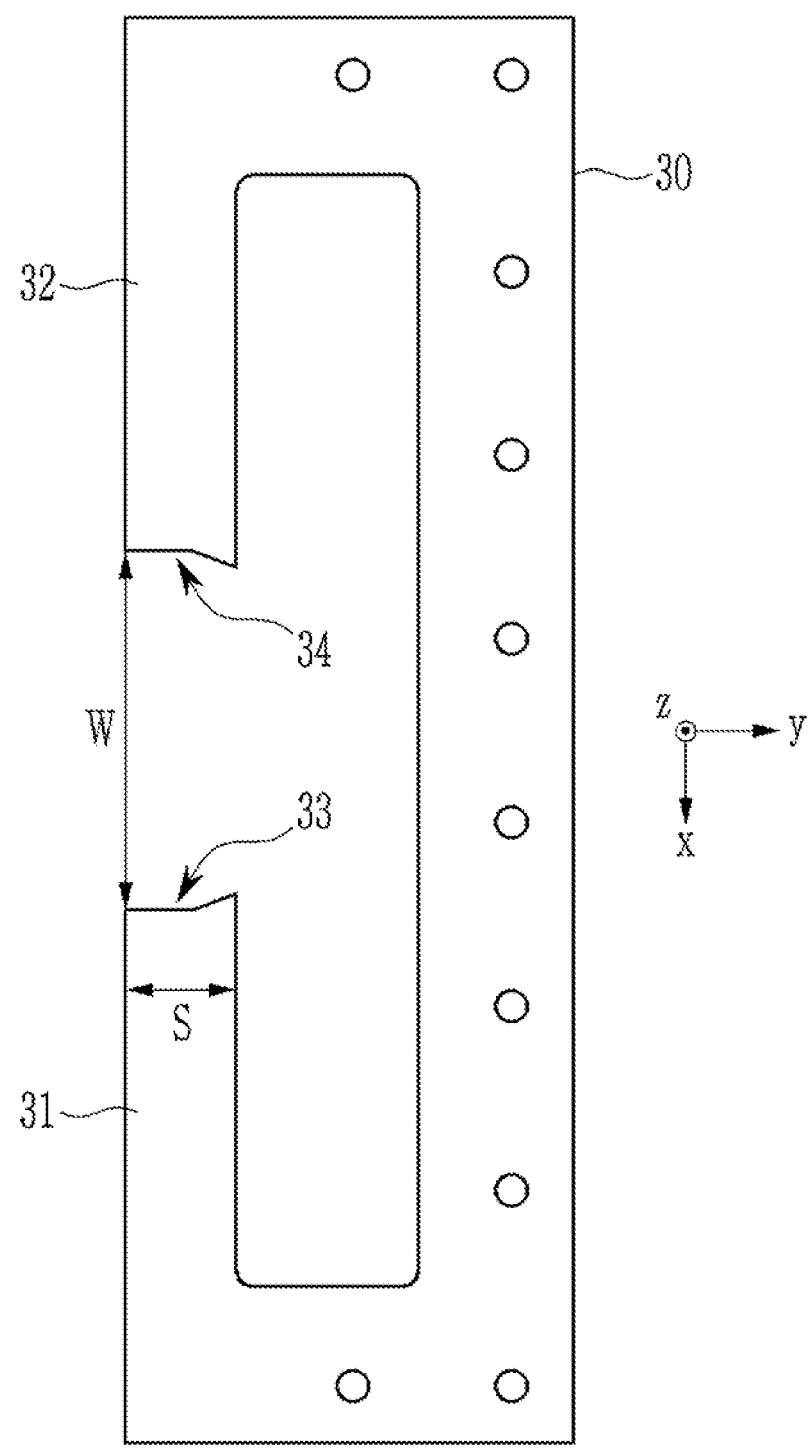
FIG. 2 shows a top plan view of a shim member shown in FIG. 1.

FIG. 1 shows an exploded perspective view of a slot die for manufacturing a rechargeable battery electrode according to a first exemplary embodiment. FIG. 2 shows a top plan view of a shim member shown in FIG. 1, and FIG. 3 shows a cross-sectional view with respect along line of FIG. 1.

Figure 3:
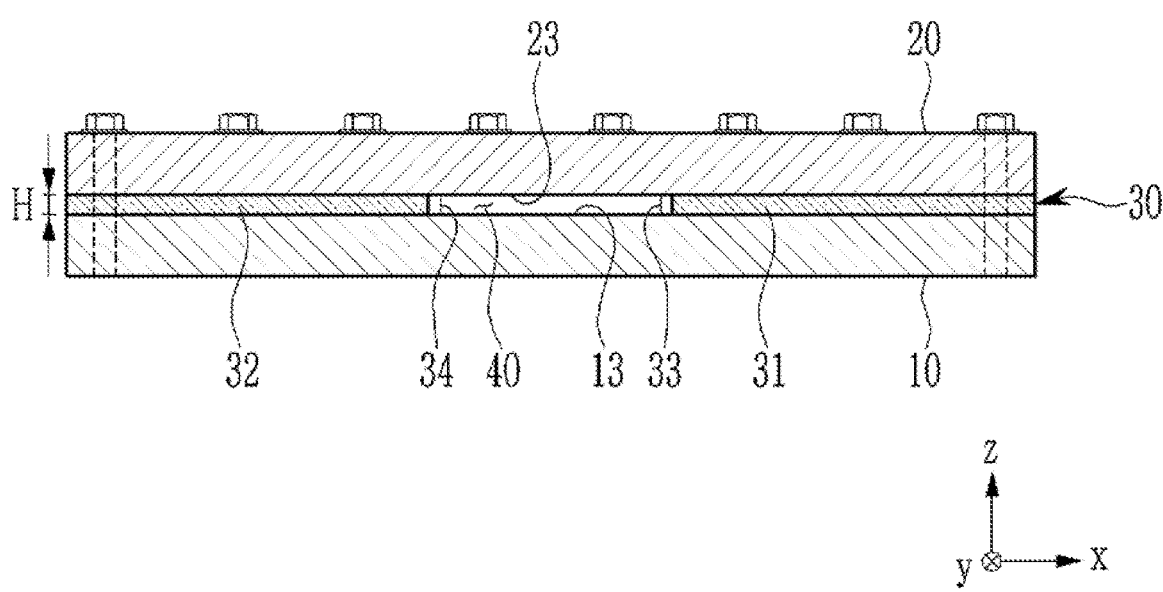
FIG. 3 shows a cross-sectional view along line of FIG. 1.

Referring to FIG. 1 to FIG. 3, a slot die 1 for manufacturing a rechargeable battery electrode according to a first exemplary embodiment of the present disclosure may include a first block 10, a second block 20, and a shim member 30 installed therebetween. The first and second blocks 10 and 20 and the shim member 30 may be fastened by a fastening member 131 to form the slot die 1.

As illustrated in FIG. 1, the first block 10 may include a chamber 11 for temporarily storing a supplied active material slurry. A supply unit 12 may be connected to a bottom of the first block 10 to supply the active material slurry to the chamber 11. As illustrated in FIG. 3, the first and second blocks 10 and 20 combined to each other form a slot 40 for discharging the active material slurry. The slot 40 may be formed to be quadrangular in the x- and z-axis directions (e.g., FIG. 3) or may be changed to be round in the x-axis direction according to the shape of the shim member 30 (e.g., FIG. 10).

As illustrated in FIG. 3, the first block 10 may form, e.g., define, a first side 13 of the slot 40, e.g., the first side 13 may face the slot 40 in a width direction (x-axis direction) and a discharging direction (y-axis direction) at the bottom of the slot 40. The second block 20 may form, e.g., define, a second side 23 of the slot 40, e.g., the second side 23 may face the slot 40 and the first side in the width direction (x-axis direction) and the discharging direction (y-axis direction). The first and second sides 13 and 23 may be spaced apart from each other in the height direction (z-axis direction) of the slot 40.

As illustrated in FIG. 3, the shim member 30 is installed between the first and second blocks 10 and 20, and includes first and second end portions 31 and 32 facing each other at the respective ends of the first side 13 and the second side 23 of the slot 40. Terminal ends of the first and second end portions 31 and 32 of the shim member 30 face each other and form, e.g., define, a third side 33 and a fourth side 34, respectively, of the slot 40. The third and fourth sides 33 and 34 of the slot 40 face each other on a virtual plane of the slot 40 in the height direction (z-axis direction) and the discharging direction (y-axis direction), e.g., the third and fourth sides 33 and 34 of the slot 40 may be spaced apart from each other along the width direction (x-axis direction). For example, as illustrated in FIG. 2, a distance between the third and fourth sides 33 and 34 of the slot 40 may be non-constant in the x-axis direction, as will be described in more detail below with reference to FIG. 4.

As further illustrated in FIG. 3, the shim member 30 may have a thickness in the z-axis direction that sets a height (H) of the slot 40. Further, as illustrated in FIG. 2, a gap between the third and fourth sides 33 and 34 (a distance in the x-axis direction) sets the width (W) of the slot 40, and the width of the first and second end portions 31 and 32 in the discharging direction (y-axis direction) sets a length (S) of the slot 40 in the discharging direction (y-axis direction). The gap between the third and fourth sides 33 and 34 in the x-direction, i.e., the width (W), is measured at the end of the discharging direction (y-axis direction) of the third and fourth sides 33 and 34, e.g., along an imaginary line connecting outermost surfaces of the end portions 31 and 32 (FIG. 2).

The slot die 1 temporarily stores the active material slurry supplied by the supply unit 12 in the chamber 11 and then discharges it through the slot 40. Therefore, the active material slurry may be applied to a substrate through a front side, e.g., a front end, of the slot 40 to form an active material layer on the substrate, e.g., to form an active material layer (AL) on a substrate (ES) in FIG. 14.

Figure 4:
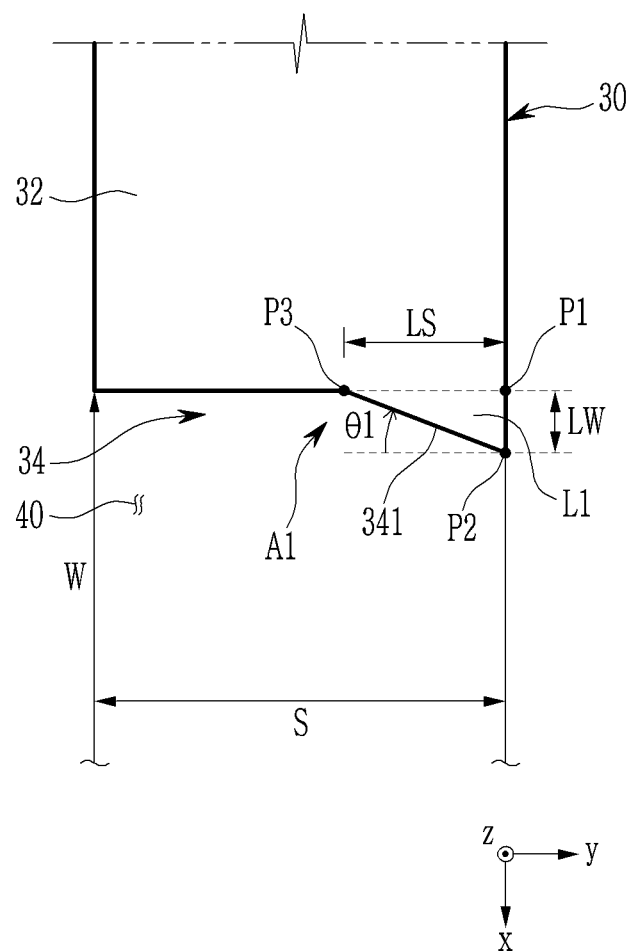
FIG. 4 shows a top plan view of an end portion on one side of a shim member for setting a width of a slot shown in FIG. 2.

FIG. 4 shows a top plan view of the fourth side 34 of the second end portion 32 of the shim member 30 for setting a width of the slot shown in FIG. 2. For ease of description, FIG. 4 will exemplify only the second end portion 32 on one side. For example, as illustrated in FIG. 2, the first end portion 31 has a substantially same structure as the second end portion 32, and is symmetrical to the second end portion 32 with respect to the y-axis direction.

Referring to FIG. 2 to FIG. 4, the second end portion 32 includes a width adjuster A1 protruding to a second reference point P2 from a first reference point P1 of the shim member 30 in the width direction (x-axis direction) by a first adjusting width (Lw), inclined to a third reference point P3 from the second reference point P2 with a first angle θ1 with respect to the discharging direction (y-axis direction), and formed in the discharging direction (y-axis direction) by a first adjusting length (Ls). For example, as illustrated in FIG. 4, the fourth side 34 of the second end portion 32 may include a linear part adjacent to the front end of the slot that extends linearly (along the y-axis direction) only along part of the second end portion 32, and the width adjuster A1 of the second end portion 32 that may have a triangular planar shape that protrudes along the x-axis direction beyond the linear part of the fourth side 34 toward the first end portion 31 (in FIG. 2). As viewed in a top view, the linear part of the fourth side 34 may be between the first triangular planar shape of the width adjuster A1 and the front end of the slot 40 in the discharging direction (FIG. 4).

Substantially, the width adjuster A1 is positioned on the facing third and fourth sides 33 and 34, e.g., to have the triangular planar shapes of the end portions protrude and extend toward each other (as viewed in a top view). The width adjuster A1 includes a width increased portion 341 for gradually increasing the width (W) of the slot 40 from a minimum width, e.g., measured between respective second reference point P2 of the first and second end point 31 and 32 along the x-axis direction, to the width W of the front end of the slot 40, e.g., measured between facing linear portions of the third and fourth sides 33 and 34 along the x-axis direction. The width increased portion 341 protrudes to the second reference point P2 from the first reference point P1 of the shim member 30 in the width direction (x-axis direction) by a first adjusting width (Lw), i.e., a first adjuster side opposite the front end of the slot 40, is inclined to the third reference point P3 from the second reference point P2 with the first angle θ1 with respect to the discharging direction (y-axis direction), and is formed in the discharging direction (y-axis direction) by the first adjusting length (Ls) (i.e., a second adjuster side extending from the first adjuster side toward the front end of the slot 40 along an imaginary line in the discharging direction).

A1 and L1 set with the first adjusting width (Lw) and the first adjusting length (Ls) at the second end portion 32 of the shim member 30 increases the discharging rate of the active material slurry in a central portion of the slot 40 in the width direction (x-axis direction), and reduces the discharging rate of the active material slurry on the third and fourth sides 33 and 34 corresponding to the respective sides of the slot 40 in the width direction (x-axis direction). That is, the land L1 of the end portion 32 controls the discharging rate of the active material slurry throughout the width (W) of the slot 40 to be further uniform.

The width increased portion 341 and the land L1 of the second end portion 32 will now be described in detail. A width ratio (Lw/W) of the first adjusting width (Lw) to the width (W) of the slot 40 may be greater than zero (0) and equal to or less than 0.1 (0<Lw/W≤0.1), e.g., (0.02≤Lw/W≤0.06). When the width ratio (Lw/W) is within the range (0<Lw/W≤0.1), the discharging rate of the active material slurry appropriately falls, and the active material slurry may be uniformly coated on the substrate (ES). Further, when the width ratio (Lw/W) of the slot 40 is equal to or greater than 0.02 and equal to or less than 0.06 (0.02≤Lw/W≤0.06), the width ratio (Lw/W) may reduce the discharging rate of the active material slurry. Hence, the width increased portion 341 and the land L1 of the second end portion 32 may control the discharging rate of the active material slurry throughout the width (W) of the slot 40 to be further uniform.

A length ratio (Ls/S) of the first adjusting length (Ls) relative to the length (S) of the slot 40 in the discharging direction (y-axis direction) may be greater than 0 and equal to or less than 0.5 (0<Ls/S≤0.5), e.g., (0.05≤Ls/S≤0.2). When the length ratio (Ls/S) is within the range (0<Ls/S≤0.5), the reduced discharging rate of the active material slurry may be maintained for an appropriate time. Further, when the length ratio (Ls/S) of the slot 40 in the discharging direction (y-axis direction) is equal to or greater than 0.05 and equal to or less than 0.2 (0.05≤Ls/S≤0.2), the length ratio (Ls/S) may maintain the reduced discharging rate of the active material slurry for a predetermined time. Therefore, the width increased portion 341 and the land L1 of the second end portion 32 may control the discharging rate of the active material slurry throughout the width (W) of the slot 40 to be further uniform.

The first angle θ1 given when an inclined side for connecting the second reference point P2 and the third reference point P3 is set for the discharging direction (y-axis direction) may be greater than 0° and equal to or less than 30° (0°<θ1≤30°), e.g., (5°≤θ1≤25°). When the first angle θ1 is within the range (0°<θ1≤30°), the discharging rate of the active material slurry is appropriately reduced, and the active material slurry may be uniformly coated on the substrate. Further, when the first angle θ1 is equal to or greater than 5° and equal to or less than 25° (5°≤θ1≤25°), the first angle θ1 may appropriately reduce the discharging rate of the active material slurry. Therefore, the width increased portion 341 and the land L1 of the second end portion 32 may control the discharging rate of the active material slurry throughout the width (W) of the slot 40 to be further uniform.

In another way, when the active material slurry has lower viscosity than required, an edge spreading phenomenon increases, and an edge sinking phenomenon increases because of a reduction of flux from the respective sides of the slot 40 in the width direction (y-axis direction). When the active material slurry has higher viscosity than required, an edge soaring phenomenon is generated. That is, the edge soaring phenomenon may be generated because of reinforcement of surface tension of the active material slurry caused by a reduction of flux of the active material slurry on the respective sides of the slot 40 in the width direction (y-axis direction). Therefore, the active material slurry has viscosity corresponding to a type of the configured material, and the discharging rate on the width direction of the slot 40 may become uniform within the required viscosity range.

Various exemplary embodiments of the present disclosure will now be described. The first exemplary embodiment and the above-described exemplary embodiments will be compared, the same configurations will be omitted, and different configurations will be described.

Figure 5:
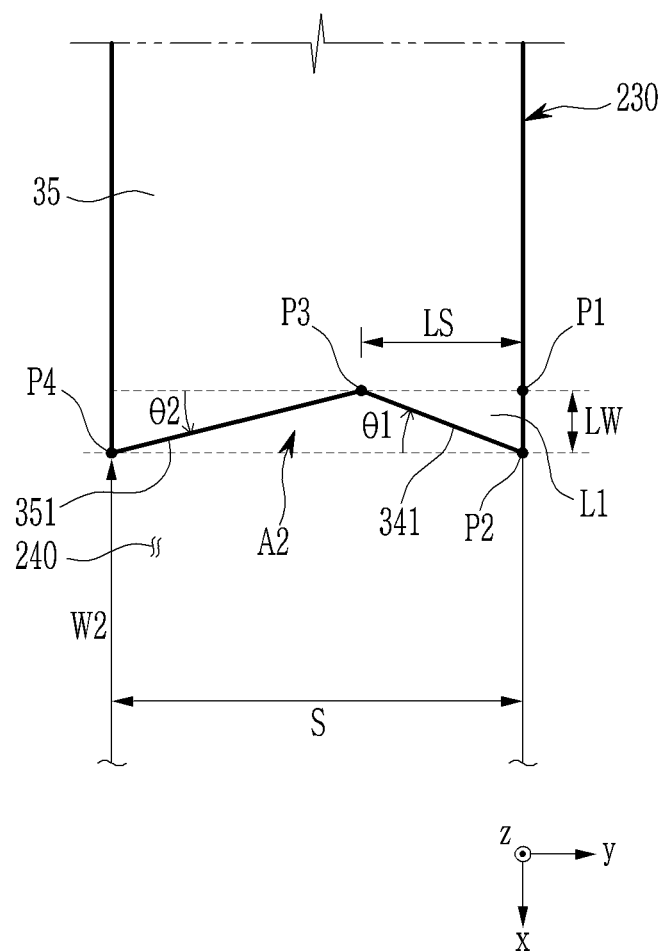
FIG. 5 shows a top plan view of an end portion on one side of a shim member for setting a width of a slot in a slot die for manufacturing a rechargeable battery electrode according to a second exemplary embodiment.

FIG. 5 shows a top plan view of an end portion on one side of a shim member for setting a width of a slot in a slot die for manufacturing a rechargeable battery electrode according to a second exemplary embodiment of the present disclosure.

Referring to FIG. 5, an end portion 35 of a shim member 230 includes an additional width adjuster, e.g., a width adjuster A2, on a slot die according to a second exemplary embodiment. The width adjuster A2 further includes a width reduced portion 351 in the width increased portion 341, e.g., as compared to the shim member 30 in FIG. 4. The width reduced portion 351 is connected to the width increased portion 341 in the discharging direction (y-axis direction), and gradually reduces the width W2 of a slot 240 in the discharging direction.

The width reduced portion 351 is formed to have a third adjuster side with a second adjusting width in the width direction and parallel to the first adjuster side of the width increased portion 341, e.g., the third adjuster side may be at the front end of the slot 240 (FIG. 5), and a fourth adjuster side extending in the discharging direction from the third adjuster side along an imaginary line toward the width increased portion 341. The fourth adjuster side may have the length (S-Ls) obtained by subtracting the first adjusting length (Ls) from the length (S) in the discharging direction (y-axis direction), and may be inclined at a second angle θ2 in an opposite direction to the first angle θ1 with respect to the discharging direction (y-axis direction) to the fourth reference point P4 from the third reference point P3 that is an end point of the width increased portion 341 in the shim member 230. For example, as illustrated in FIG. 5, a distance between the end portions of the shim member 230 along the width direction is greater at a center of the slot 240 than at the front end thereof. The end portion 35 of the shim member 230 further controls the discharging rate of the active material slurry to the width reduced portion 351 in addition to the operation of the shim member 30 and the land L1 according to the first exemplary embodiment.

The second angle θ2 for an inclined side connecting the third reference point P3 and the fourth reference point P4 to be set with respect to the discharging direction (y-axis) may be greater than 0° and equal to or less than 15° (0°<θ2≤15°), e.g., (5°≤θ2≤10°). When the second angle θ2 is within the range (0°<θ2≤15°), the reduced discharging rate of the active material slurry appropriately increases, so the active material slurry may be uniformly coated on the substrate. Further, when the second angle θ2 is equal to or greater than 5° and equal to or less than 10° (5°≤θ2≤10°), the second angle θ2 may appropriately increase the reduced discharging rate of the active material slurry. Hence, the width reduced portion 351 of the end portion 35 may control the discharging rate of the active material slurry throughout the width W2 of the slot 240 to be further uniform.

Figure 6:
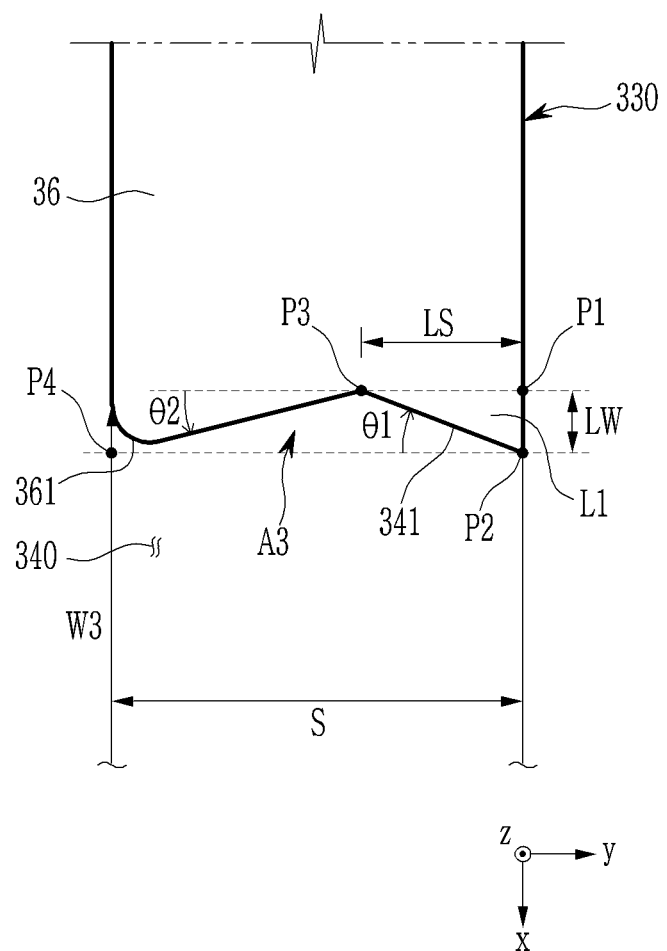
FIG. 6 shows a top plan view of an end portion on one side of a shim member for setting a width of a slot in a slot die for manufacturing a rechargeable battery electrode according to a third exemplary embodiment.

FIG. 6 shows a top plan view of an end portion on one side of a shim member for setting a width of a slot in a slot die for manufacturing a rechargeable battery electrode according to a third exemplary embodiment of the present disclosure.

Referring to FIG. 6, regarding the slot die according to a third exemplary embodiment, an end portion 36 of a shim member 330 includes an additional width adjuster, e.g., a width adjuster A3. The width adjuster A3 further includes a convex round portion 361 at the end of the width reduced portion 351 of the shim member 230 according to the second exemplary embodiment. The convex round portion 361 of the end portion 36 is made round, e.g., curved, at the end of the discharging direction to increase the width W3 of the slot 340 in the discharging direction. In this case, the convex round portion 361 of the width reduced portion 351 may appropriately reduce the increased discharging rate of the active material slurry. Hence, the convex round portion 361 of the width reduced portion 351 may control the discharging rate of the active material slurry throughout the width W3 of the slot 340 to be further uniform at the end portion 36.

Figure 7:
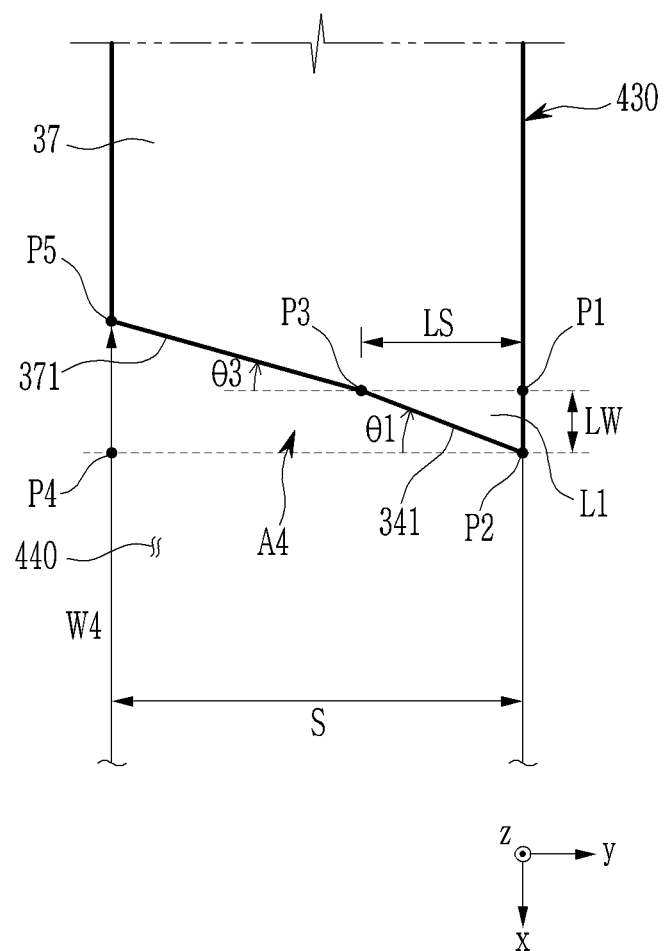
FIG. 7 shows a top plan view of an end portion on one side of a shim member for setting a width of a slot in a slot die for manufacturing a rechargeable battery electrode according to a fourth exemplary embodiment.

FIG. 7 shows a top plan view of an end portion on one side of a shim member for setting a width of a slot in a slot die for manufacturing a rechargeable battery electrode according to a fourth exemplary embodiment of the present disclosure.

Referring to FIG. 7, regarding the slot die according to the fourth exemplary embodiment, an end portion 37 of a shim member 330 includes a width adjuster A4. The width adjuster A4 further includes an additional width increased portion 371 in the width increased portion 341 according to the first exemplary embodiment shim member 30. The additional width increased portion 371 is connected to the width increased portion 341 in the discharging direction (y-axis direction), and gradually additionally increases the width W4 of the slot 440 in the discharging direction (y-axis direction).

The additional width increased portion 371 is formed to have the length (S-Ls) obtained by subtracting the first adjusting length (Ls) from the length (S) in the discharging direction (y-axis direction) in an inclined way with the third angle θ3 in a direction of the first angle θ1 with respect to the discharging direction to the fifth reference point P5 from the third reference point P3 that is the end point of the width increased portion 341 of the shim member 430. The end portion 37 of the shim member 430 further controls the discharging rate of the active material slurry with the additional width increased portion 371 in addition to the operation of the land L1 of the shim member 30 according to the first exemplary embodiment.

The third angle θ3 for the inclined side connecting the third reference point P3 and the fifth reference point P5 to be set with respect to the discharging direction (y-axis) may be greater than 0° and equal to or less than 25° (0°<θ3≤25°), e.g., (5°≤θ3≤20°). When the third angle θ3 is within the range (0°<θ3≤25°), the reduced discharging rate of the active material slurry is additionally appropriately reduced, so the active material slurry may be uniformly coated on the substrate. Further, when the third angle θ3 is equal to or greater than 5° and equal to or less than 20° (5°≤θ3≤20°), the third angle θ3 may additionally appropriately reduce the reduced discharging rate of the active material slurry. Hence, the additional width increased portion 371 of the end portion 37 may control the discharging rate of the active material slurry throughout the width W4 of the slot 440 to be further uniform.

Figure 8:
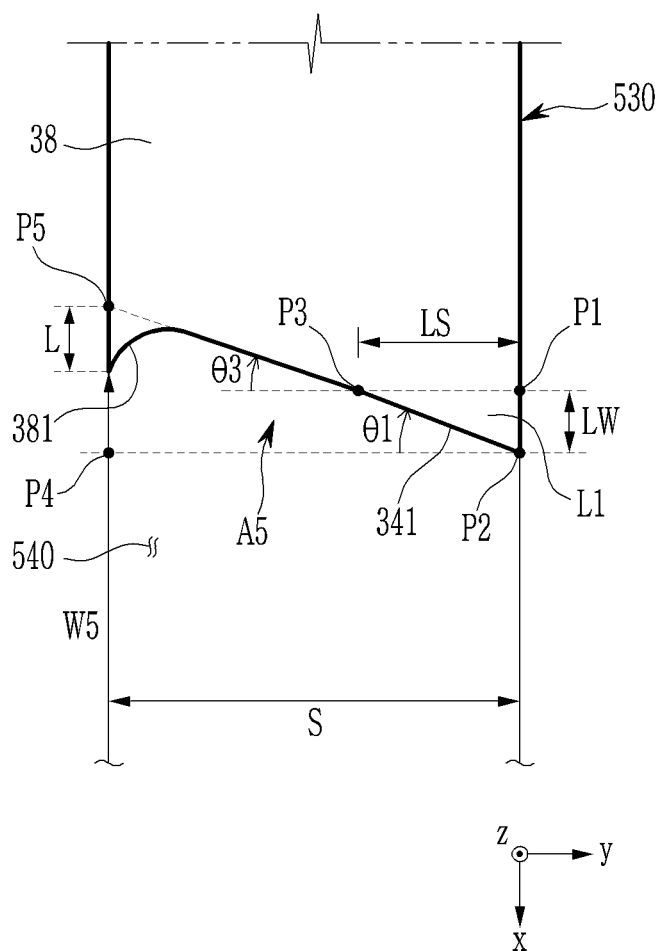
FIG. 8 shows a top plan view of an end portion on one side of a shim member for setting a width of a slot in a slot die for manufacturing a rechargeable battery electrode according to a fifth exemplary embodiment.

FIG. 8 shows a top plan view of an end portion on one side of a shim member for setting a width of a slot in a slot die for manufacturing a rechargeable battery electrode according to a fifth exemplary embodiment of the present disclosure.

Referring to FIG. 8, regarding the slot die according to a fifth exemplary embodiment, an end portion 38 of a shim member 530 includes a width adjuster A5. The width adjuster A5 further includes a concave round portion 381 at the end of the additional width increased portion of the shim member 430 according to the fourth exemplary embodiment.

The concave round portion 381 of the end portion 38 is formed to be round at the end of the discharging direction to reduce the width W5 of the slot 540 in the discharging direction. In this case, the concave round portion 381 of the additional width increased portion may appropriately increase the reduced discharging rate of the active material slurry. Hence, the concave round portion 381 of the additional width increased portion may control the discharging rate of the active material slurry throughout the width W5 of the slot 540 to be further uniform at the end portion 38.

Figure 9:
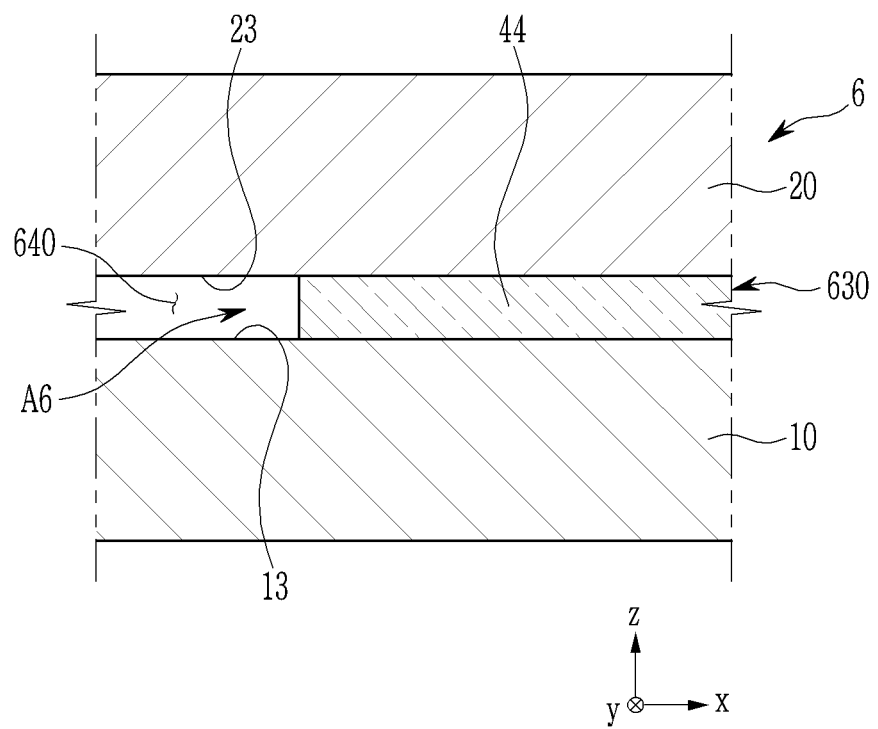
FIG. 9 shows a partial side view of an end portion on one side of a shim member for setting a width of a slot in a slot die for manufacturing a rechargeable battery electrode according to a sixth exemplary embodiment.

FIG. 9 shows a partial side view of an end portion on one side of a shim member for setting a width of a slot in a slot die for manufacturing a rechargeable battery electrode according to a sixth exemplary embodiment of the present disclosure.

Referring to FIG. 9, regarding a slot die 6 according to a sixth exemplary embodiment, the width adjuster A6 installed in an end portion 44 of a shim member 630 is formed to have a cross-section of a straight line toward a slot 640 in the height direction (z-axis direction) so as to be vertically connected to the first side 13 and the second side 23. The width adjuster A6 that forms a straight line controls the rate-controlled active material slurry to be uniform in the height direction of the slot 640.

Figure 10:
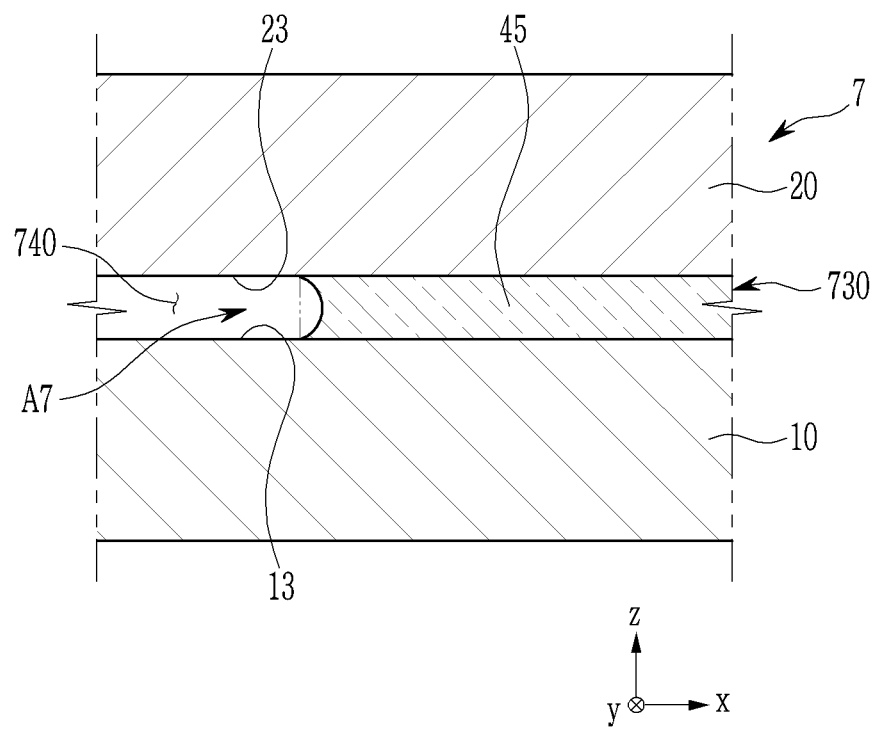
FIG. 10 shows a partial side view of an end portion on one side of a shim member for setting a width of a slot in a slot die for manufacturing a rechargeable battery electrode according to a seventh exemplary embodiment.
Figure 11:
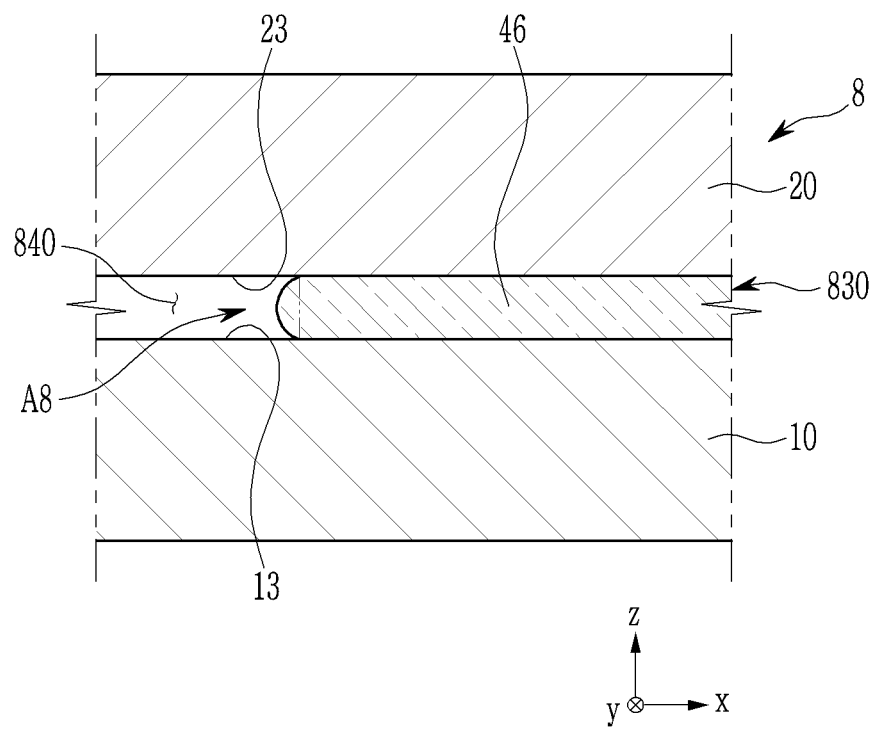
FIG. 11 shows a partial side view of an end portion on one side of a shim member for setting a width of a slot in a slot die for manufacturing a rechargeable battery electrode according to an eighth exemplary embodiment.

FIG. 10 shows a partial side view of an end portion on one side of a shim member for setting a width of a slot in a slot die for manufacturing a rechargeable battery electrode according to a seventh exemplary embodiment of the present disclosure, and FIG. 11 shows a partial side view of an end portion on one side of a shim member for setting a width of a slot in a slot die for manufacturing a rechargeable battery electrode according to an eighth exemplary embodiment of the present disclosure.

Referring to FIG. 10 and FIG. 11, regarding slot dies 7 and 8 according to the seventh and eighth exemplary embodiments, width adjusters A7 and A8 installed in end portions 45 and 46 of shim members 730 and 830 are respectively formed to have a cross-section that is curved, e.g., to be concave round and convex round, toward the slots 740 and 840 so as to be connected to the first side 13 and the second side 23 in a round way. The concave round width adjuster A7 adjusts the rate-adjusted active material slurry to be a minimum in a center of the slot 740 in the height direction (z-axis direction) and to be a maximum at the respective ends thereof. The convex round width adjuster A8 adjusts the rate-adjusted active material slurry to be a maximum in the center of the slot 840 in the height direction (z-axis direction) and to be a minimum at the respective ends thereof The shim members 630, 730, and 830 of the slot dies 6, 7, and 8 according to sixth, seventh, and eighth exemplary embodiments may be selectively applied to the shim members 30, 230, 330, 430, and 530 of the slot dies according to first to fifth exemplary embodiments to further uniformly control the discharging rate of the active material slurry throughout the widths W, W2, W3, W4, and W5 of the slots 40, 240, 340, 440, and 540.

An evaluation example of the coating thicknesses of the active material slurries AL0 and AL on the substrates ES0 and ES will now be described with reference to FIG. 12 to FIG. 14.

Figure 12:
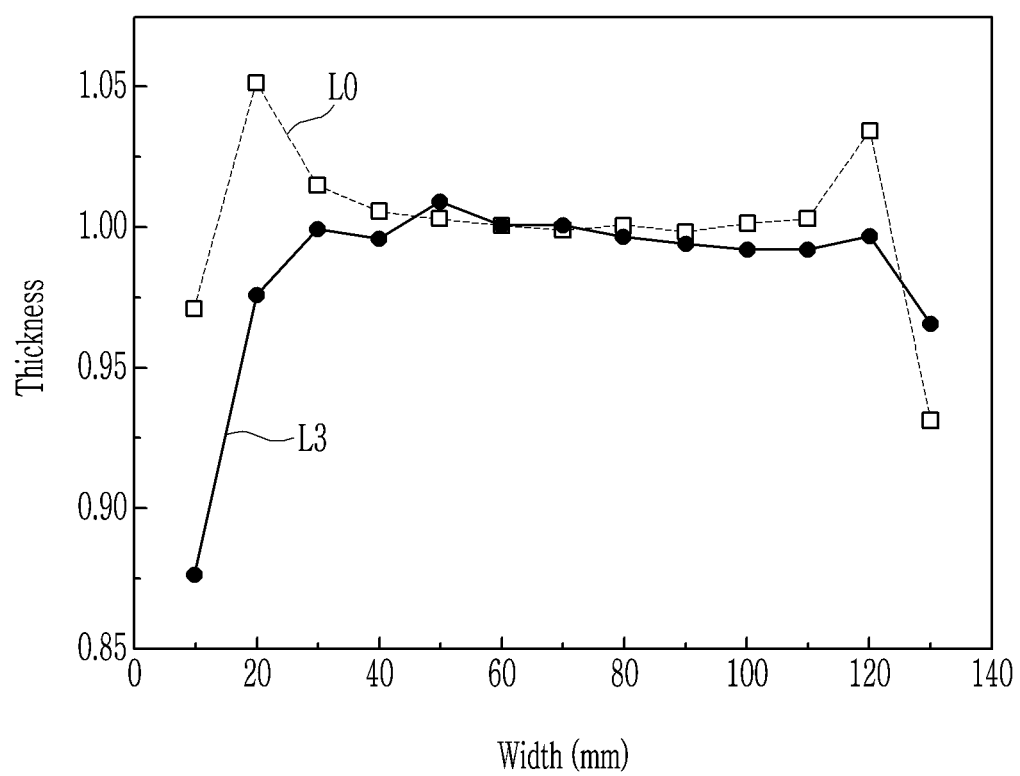
FIG. 12 shows a graph of a coating thickness relationship of an active material slurry with respect to a width of a slot in slot dies according to exemplary embodiments in comparison to slot dies according to a comparative example.

FIG. 12 shows a graph of a coating thickness relationship of the active material slurry with respect to a width of a slot in a slot dies according to exemplary embodiments and according to a width of a slot in a comparative example. The respective ends of the shim member are formed to have a maximum width inside in the discharging direction (y-axis direction) and are formed to become gradually narrower in its width as it approaches an outside in the comparative example, e.g., the gradual width variation occurs in a direction opposite to that in the exemplary embodiments (for example, referring to FIG. 5, the slot die according to a comparative example would form a width reduced portion from the first reference point P1 throughout the length (S) of the discharging direction (y-axis direction) and the width reduced portion would be formed to be inclined by the size of the first angle θ1 in the opposite direction to the first angle θ1).

FIG. 12 shows a graph for comparing a thickness relationship of the active material slurry with respect to a width W3 of the slot 340, regarding a slot die to which a shim member according to a comparative example is applied and a slot die to which a shim member 330 according to an exemplary embodiment (e.g., a third exemplary embodiment) is applied.

A relational line L0 according to a comparative example has an edge soaring shape for providing the maximum thickness of the active material slurry at the respective ends of the slot in the width direction. Compared to this, the relational line L3 according to an exemplary embodiment provides a generally uniform thickness of the active material slurry of the slot 340 in the width W3 direction.

Figure 13:
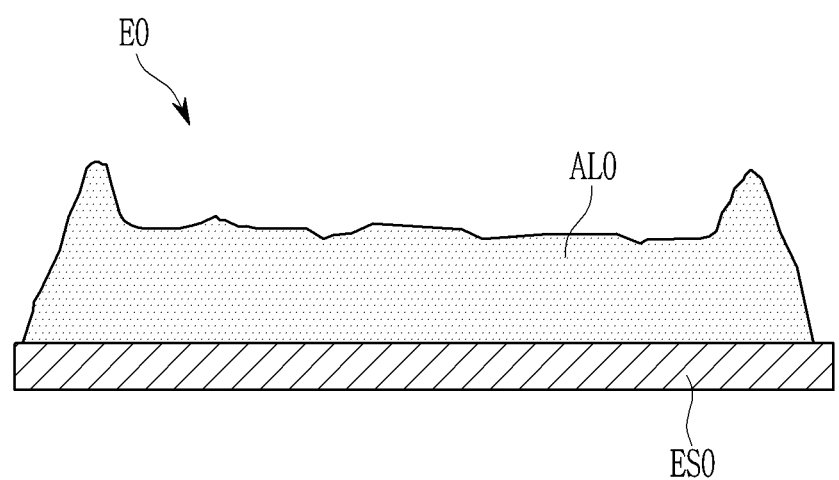
FIG. 13 shows a cross-sectional view of an electrode showing a coating thickness of an active material layer with respect to a width of a substrate in a comparative example of an evaluation example.

FIG. 13 shows a cross-sectional view of an electrode showing a coating thickness of an active material layer with respect to a width of the substrate in a comparative example of an evaluation example (e.g., corresponding to line L0 in FIG. 12). FIG. 14 shows a cross-sectional view of an electrode showing a coating thickness of an active material layer with respect to a width of the substrate in a comparative example of an evaluation example (e.g., corresponding to line L3 in FIG. 12).

Figure 14:
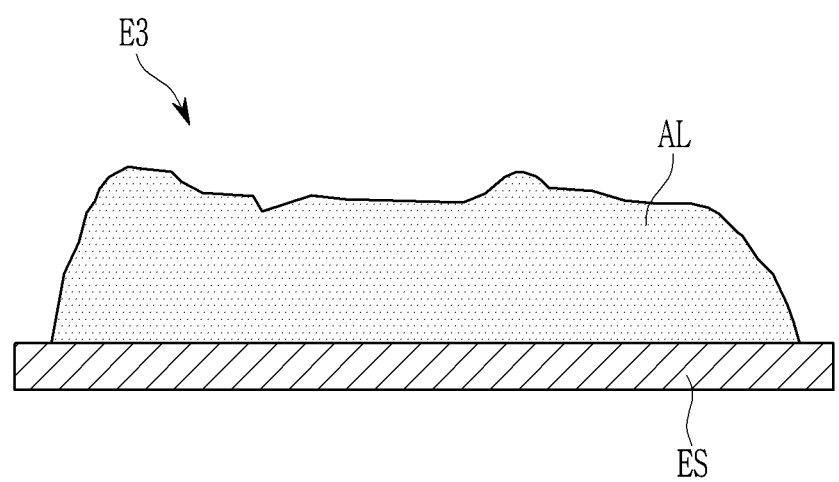
FIG. 14 shows a cross-sectional view of an electrode showing a coating thickness of an active material layer with respect to a width of a substrate in a comparative example of an evaluation example.

Referring to FIG. 13 and FIG. 14, the electrode E0 according to a comparative example has a big edge soaring shape of the active material layer AL0 at the respective ends of the substrate ES0 according to the relational line L0. Compared to this, the electrode E3 according to an exemplary embodiment may form an active material layer (AL) with a generally uniform thickness in the width direction of the substrate (ES) according to the relational line L3.

By way of summation and review, a width of a slot set between respective ends of a shim member in a slot die may affect the distribution of discharging rates of an active material slurry coated on an electrode. For example, when the discharging rate of the active material slurry is non-uniform, a soaring phenomenon of the active material slurry may be generated at edges of the respective ends of the substrate in a width direction, and a coating thickness of the active material slurry of the substrate in the width direction may be non-uniform.

In contrast, the present disclosure provides a slot die for manufacturing a rechargeable battery electrode with a uniform coating thickness of an active material layer in terms of a width of a substrate by providing a uniform discharging rate distribution of an active material slurry in terms of a width of a slot. That is, the slot die according to example embodiments provides a uniform discharging rate distribution of the active material slurry to prevent the soaring shape of the active material slurry on the edges of the respective ends of the substrate in the width direction, in terms of the width of the slot set between the respective ends of the shim member. Therefore, the uniform coating thickness of the active material layer is obtained in the width direction of the substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A slot die for manufacturing a rechargeable battery electrode, the slot die comprising:
   a first block including a chamber to accommodate an active material slurry;
   a second block facing the first block, the first block and the second block being attached to each other;
   a shim member positioned between the first block and the second block, the shim member including end portions facing each other; and
   a slot between the first and second blocks, and between the facing end portions of the shim member, the slot to discharge the active material slurry through a front end thereof, and the slot including:
      a first side defined by the first block, the first side extending in a width direction and a discharging direction of the slot, and
      a second side defined by the second block, the second side facing the first side and extending in the width direction and the discharging direction of the slot,
   wherein each of the end portions of the shim member includes a width adjuster with a first triangular planar shape, as viewed in a top view, the first triangular planar shape of one of the end portions protruding toward the first triangular planar shape of another one of the end portions,
   wherein a distance between the end portions of the shim member along the width direction increases toward the front end of the slot, and
   wherein the first triangular planar shape includes:
      a first adjuster side having a first adjusting width in the width direction, the first adjuster side being opposite the front end of the slot,
      a second adjuster side extending from the first adjuster side toward the front end of the slot along an imaginary line in the discharging direction, the second adjuster side having a first adjusting length, and
      a first angle with respect to the discharging direction.

2. The slot die as claimed in claim 1, wherein a width ratio of the first adjusting width to a width of the slot in the width direction is greater than 0 and equal to or less than 0.1.

3. The slot die as claimed in claim 2, wherein the width ratio of the first adjusting width to the width of the slot is equal to or greater than 0.02 and equal to or less than 0.06.

4. The slot die as claimed in claim 1, wherein a length ratio of the first adjusting length to a length of the slot in the discharging direction is greater than 0 and equal to or less than 0.5.

5. The slot die as claimed in claim 1, wherein the first angle is greater than 0° and equal to or less than 30°.

6. The slot die as claimed in claim 1, wherein each of the end portions of the shim member includes:
   a linear part adjacent to the front end of the slot, and
   the width adjuster with the first triangular planar shape, the first triangular planar shape protruding into the slot beyond the linear part, as viewed in a top view, and the linear part being between the first triangular planar shape and the front end of the slot in the discharging direction.

7. The slot die as claimed in claim 1, wherein each of the end portions of the shim member further includes an additional width adjuster having a second triangular planar shape connected to the first triangular planar shape in the discharging direction, the second triangular planar shape including:
   a third adjuster side having a second adjusting width in the width direction and parallel to the first adjuster side of the first triangular planar shape, the third adjuster side being at the front end of the slot,
   a fourth adjuster side having a second adjusting length in the discharging direction, the fourth adjuster side extending from the third adjuster side along an imaginary line toward the first triangular planar shape, and
   a second angle with respect to the discharging direction, the second angle being different from the first angle.

8. The slot die as claimed in claim 7, wherein the distance between the end portions of the shim member along the width direction is greater at a center of the slot than at the front end thereof.

9. The slot die as claimed in claim 7, wherein the second angle is greater than 0° and equal to or less than 15°.

10. The slot die as claimed in claim 7, wherein the additional width adjuster further includes a convex round portion further connected to the second triangular planar shape in the discharging direction, the convex round portion being round at an end of the discharging direction and increasing the width of the slot in the discharging direction.

11. The slot die as claimed in claim 1, wherein each of the end portions of the shim member further includes an additional width adjuster connected to the width adjuster in the discharging direction, the additional width adjuster additionally increasing the width of the slot in the discharging direction.

12. The slot die as claimed in claim 11, wherein the additional width adjuster further includes a concave round portion, the concave round portion being round at an end of the discharging direction, and reducing the width of the slot in the discharging direction.

13. The slot die as claimed in claim 1, wherein each of the end portions of the shim member further includes an inclined surface facing the slot and adjacent to the width adjuster in the discharging direction, the inclined surface being inclined at a third angle with respect to the discharging direction, as viewed in a top view.

14. The slot die as claimed in claim 13, wherein the third angle is greater than 0° and equal to or less than 25°.

15. The slot die as claimed in claim 1, wherein the width adjuster has a cross-section of a straight line in a height direction so as to be vertically connected to the first side and the second side of the slot.

16. The slot die as claimed in claim 1, wherein the width adjuster has a cross-section that is curved toward the slot so as to be connected to the first side and the second side of the slot in a round way.

* * * * *